United States Patent [19]

Shigetani et al.

[11] Patent Number: 4,968,554

[45] Date of Patent: Nov. 6, 1990

[54] SUPPORT SHEET FOR PHOTOGRAPHIC PAPER

[75] Inventors: Tsunehisa Shigetani; Masahiro Yamana, both of Tokyo; Takao Ayukawa, Nichinan; Masahiro Kamiya, Tokyo, all of Japan; Tetsu Uesaka, Pointe Claire, Canada

[73] Assignee: Oji Paper Co., Ltd., Tokyo, Japan

[21] Appl. No.: 259,682

[22] Filed: Oct. 19, 1988

[30] Foreign Application Priority Data

Oct. 22, 1987 [JP] Japan ............................... 62-265221

[51] Int. Cl.[5] ......................... B32B 27/10; G03C 1/88

[52] U.S. Cl. .................................... 428/216; 428/507; 428/511; 428/513; 430/496; 430/531; 430/538; 264/176.1; 427/44

[58] Field of Search ............... 428/216, 513, 511, 507; 430/496, 531, 538

[56] References Cited

FOREIGN PATENT DOCUMENTS

| | | |
|---|---|---|
| 1772347 | 3/1971 | Fed. Rep. of Germany . |
| 2718245 | 11/1977 | Fed. Rep. of Germany . |
| 52-130626A | 11/1977 | Japan . |
| 55-96946A | 7/1980 | Japan . |
| 1269802 | 4/1972 | United Kingdom . |
| 1534110 | 11/1978 | United Kingdom . |

*Primary Examiner*—P. C. Sluby

*Attorney, Agent, or Firm*—Armstrong, Nikaido, Marmelstein, Kubovcik & Murray

[57] ABSTRACT

A support sheet for photographic paper having an enhanced resistance to curling, especially twist-curling, comprises a substrate paper sheet composed of a half stratum portion thereof at the face side of a surface on which a photographic emulsion layer will be formed and the other half stratum portion thereof at the back side of the opposite surface, and two polyolefin resin coating layers on the two surfaces of the substrate paper sheet, the substrate paper sheet having a resiliency satisfying the relationships (I) and (II):

$$1.5 \leqq E_{fl}/E_{bt} \leqq 2.25 \quad \text{(I)}$$

and $$\frac{E_{fl} \cdot E_{bt}}{E_{ft} \cdot E_{bl}} \geqq 0.93 \quad \text{(II)}$$

wherein $E_{fl}$= a modulus of elasticity of the face side half stratum portion in the longitudinal direction of the substrate, $E_{bt}$= a modulus of elasticity of the back side half stratum portion in the transverse direction of the substrate, $E_{ft}$= a modulus of elasticity of the face side half stratum portion in the transverse direction of the substrate, and $E_{bl}$= a modulus of elasticity of the back side half stratum portion in the longitudinal direction of the substrate.

5 Claims, 1 Drawing Sheet

SUPPORT SHEET FOR PHOTOGRAPHIC PAPER

BACKGROUND OF THE INVENTION (1) Field of the Invention

The present invention relates to a support sheet for photographic paper. More particularly, the present invention relates to a support sheet useful for photographic paper having an enhanced resistance to curling, especially twist-curling.

(2) Description of the Related Art

A waterproof support sheet for photographic paper, comprising a substrate paper sheet and two coating layers formed on the two surfaces of the substrate paper sheet, which comprises a waterproof polyolefin resin, is widely used to accelerate a developing process of the photographic paper. The photographic paper is produced by coating a photosensitive emulsion containing gelatine, as a bonding material, on a waterproof-surface of the support sheet.

As well known in the art, the conventional waterproof support sheet is disadvantageous in that, when a photo print prepared from a photographic paper comprising the conventional waterproof support sheet is placed on a flat plane, both edge portions of the print curve upward and are raised from the flat plane so that the print is curled.

Usually, the amount of curling of the print sheet is measured and represented as follows.

A print sheet having a width of 82 mm and a length of 114 mm is placed on a flat plane at a relative humidity (RH) of 50%, at room temperature. The heights of four end points of the corners of the print sheet from the flat plane are measured, and the amount of curl of the print sheet is represented by an average of the heights of the four corner points.

Usually, the conventional print sheets exhibit an amount of curl of 1 to 5 mm at 50% RH at room temperature.

British Patent No. 1269802 and Japanese Examined Patent Publication (Kokoku) No. 48-9963 (1973) disclose a method of preventing this curling. In this method, two surfaces of a substrate sheet are coated so that one coating layer has a different weight, thickness, and/or polymer density than the other coating layer. The above-mentioned difference between the two coating layers, itself causes a curl in the resultant coated sheet. Also, when a photographic emulsion layer containing gelatine is applied to a surface of the coated sheet, the emulsion layer creates curl in the resultant photographic paper sheet. Therefore, in a resultant print sheet, the curling derived from the coating layers on the substrate sheet can be counterbalanced by the curling derived from the emulsion layer.

Nevertheless, it has been found that, when the above-mentioned balanced print sheet is left in a low humidity atmosphere, for example, at a relative humidity (RH) of 30% or less at a temperature of 30° C or more, which atmosphere may be encountered immediately after a drying step in an automatic developing process, even the balanced print sheet frequently generates an amount of curl of 5 to 30 mm. When the direction of the axis of curl created in a print sheet is parallel to the direction along which the print sheet is forwarded in an automatic developing machine, the curl of the print sheet does not create undesirable obstacles, for example, jamming and stacking, resulting in difficulty in the automatic developing operation, unless the amount of curl is at an unusual high level of 20 mm or more at 30% RH at 30° C.

But when the direction of the axis of curl is at a intersects the direction along which the print sheet is forwarded in the automatic developing machine, the print sheet is twisted during the automatic developing process and the resultant twisted curl of the print sheet frequently not only generates difficulties in the automatic developing operation but also significantly decreases the commercial value of the print sheet.

Generally, it is considered that the cause of the generation of curl in a photographic paper sheet resides in a difference in shrinkage between the gelatine-containing photographic emulsion layer formed on a surface of a support sheet and the support sheet when the photographic paper sheet is dried.

Namely, when the print sheet is dried after development or placed in a low humidity atmosphere, the gelatine-containing photographic emulsion layer on a surface of the photographic paper sheet is dried at a relatively high drying rate and thus the volume of the emulsion layer is rapidly reduced. But, in the print sheet, the shrinkage and reduction in volume of the substrate paper sheet, having two hydrophobic polyolefin coating layers coated on two surfaces thereof are gradual.

The above-mentioned phenomena result in the creation of differences in the shrinkage and reduction of volume of the emulsion layer and the substrate paper sheet, and thus the print sheet is curled in such a manner that the gelatine-containing photographic emulsion layer, which is subject to a larger shrinking force than that of the other layers, forms the inside surface of the curled sheet.

Generally, it is found that, when the print sheet is subjected to the developing and drying operations, the intensity of the resultant curl or twisted curl of the print sheet is relatively small at a drying temperature of about 50° C to about 60° C, but becomes significantly large at a drying temperature of about 70° C to about 80° C. The reason for the influence of the drying temperature on the curling of the print sheet is not absolutely clear, but it is assumed that, at a high drying temperature of 70° C or more, the flexibility and softness of the support sheet, especially the polyolefin resin coating layers, is increased, in other words, the resistance of the support sheet to deformation becomes low, and thus the support sheet is more easily curled by the shrinking force of the gelatine-containing photographic emulsion layer.

Recently, there has been a strong demand for automatic developing machines be able to be operated at an increased high speed, and to meet this demand, there is a trend toward raising the drying temperature. But, the high temperature, high rate drying operation for the print sheet in the automatic developing machine further promotes the creation of curl or twisted curl in the print sheet.

Accordingly, there is a strong demand for an improved support sheet having a reduced curl-forming property.

SUMMARY OF THE INVENTION

An object of the present invention is to provide a support sheet for photographic paper having a reduced curl (twisted curl)-forming property when placed in a low humidity environment or dried at a high temperature after development.

Another object of the present invention is to provide a support sheet for photographic paper which can be easily developed by an automatic developing machine without difficulty derived from the creation of a curl or twisted curl thereon, and which has a high commercial quality.

The above-mentioned objects can be attained by the support sheet of the present invention for photographic paper, comprising a substrate paper sheet; and two coating layers formed on the two surfaces of the substrate paper sheet which comprises a polyolefin resin, wherein the substrate paper sheet has a face side thereof on which a coating layer and then a photographic emulsion layer are to be formed and a back side thereof opposite to the face side, characterized in that the substrate paper sheet has a resilient property satisfying the relationships (I) and (II)

$$1.5 \leqq E_{fl}/E_{bt} \leqq 2.25$$

and $$\frac{E_{fl} \cdot E_{bt}}{E_{ft} \cdot E_{bl}} \geqq 0.93 \quad \text{(II)}$$

wherein $E_{fl}$ represents a modulus of elasticity of the face side half stratum portion in the longitudinal direction of the substrate paper sheet, $E_{bt}$ represents a modulus of elasticity of the back side half stratum portion in the transverse direction of the substrate paper sheet, Eft represents a modulus of elasticity of the face side half stratum portion in the transverse direction of the substrate paper sheet and $E_{bl}$ represents a modulus of elasticity of the back side half stratum portion in the longitudinal direction of the substrate paper sheet.

DESCRIPTION OF THE PREFERRED EMBODIMENTS

The support sheet of the present invention comprises a substrate paper sheet and two coating layers formed on the two surfaces of the substrate paper sheet which comprises a polyolefin resin.

The substrate paper sheet is produced by a paper-forming method using a paper-making machine, usually a Fourdrinier type paper machine, having a wire net sheet for forming a wet paper sheet thereon and removing a major portion of water in the wet paper sheet therethrough and a felt sheet for pressing and drying the wet paper sheet thereunder. A surface of the paper sheet is brought into contact with the wire net sheet and then the opposite surface of the paper sheet is brought into contact with the felt sheet.

The coating layers are formed on two surfaces of the substrate paper sheet.

Usually, a coating layer, comprising a polyolefin resin and titanium dioxide particles dispersed in the polyolefin resin, is formed on the surface (felt side surface) of the substrate paper sheet brought into contact with the felt sheet, and the other coating layer, comprising a polyolefin resin, is formed on the other surface (wire side surface) of the substrate paper sheet brought into contact with the wire net sheet.

That is, the felt side surface of the substrate paper sheet provides a face side of the sheet and the wire side surface of the substrate paper sheet provides a back side of the sheet. The above-mentioned relationships may be reversed, i.e., the face side may be provided by the felt side surface and the back side may be provided by the wire side surface of the substrate paper sheet.

Figure 1:
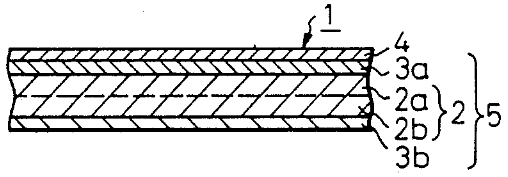
FIG. 1 is a cross-section view of a photographic paper sheet produced as an embodiment of the support sheet of the present invention.

Referring to FIG. 1, a photographic paper sheet is composed of a support sheet 5 and a photographic emulsion layer 4 formed on a surface of the support sheet 5.

The support sheet 5 is composed of a substrate paper sheet 2, face side coating layer **3*a*, and a back side coating layer 3*b***.

The substrate paper sheet is formed as one piece of a paper sheet, but due to the specific nature of the paper-making process by the Fourdrinier type paper machine, the properties of a half stratum portion of the paper sheet at the side of the forming wire-contacted surface are different from those of the remaining half stratum portion of the paper sheet at the side of the felt-contacted surface. These differences in properties occur because, in the initial stage of the dewatering operation in which pulp fibers in a pulp slurry are formed into a wet paper sheet on the paper-forming wire, the fibers located adjacent to the paper-forming wire are fixed to each other to form a fiber layer within a relatively short time, and the fibers located far from the paper-forming wire remain free from the paper-forming wire for a relatively long time. The properties of the resultant paper sheet vary gradually from the wire side surface to the opposite (felt) side surface thereof, but for convenience in the discussion of the properties of the paper sheet, it is assumed that the paper sheet is composed of a wire side half stratum portion and an opposite (felt) side half stratum portion thereof, divided from each other by a middle plane thereof.

In the substrate paper sheet usable for the support sheet of the present invention, a face side thereof may be provided by the wire side or felt side thereof, and a back side thereof may be provided by the felt side or wire side thereof.

Referring to FIG. 1, the substrate paper sheet 2 is composed of a face side half stratum portion **2*a* and a back side half stratum portion 2*b***.

The creation of a curl or twisted curl in a photographic paper sheet will be explained by referring to FIGS. 2 and 3.

Figure 2:
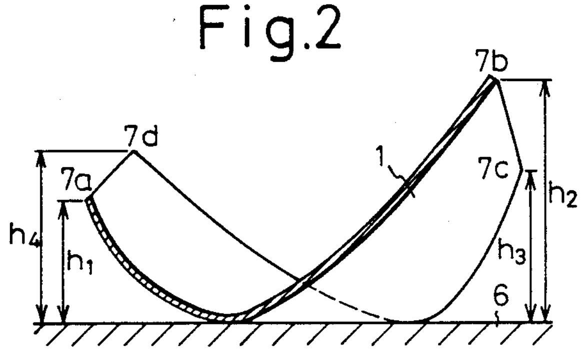
FIG. 2 is a cross-sectional front view of a curled photographic paper sheet placed on a horizontal plane; and, FIG. 3 is a plan schematic view of the curled photographic paper sheet shown in FIG. 2.
Figure 3:
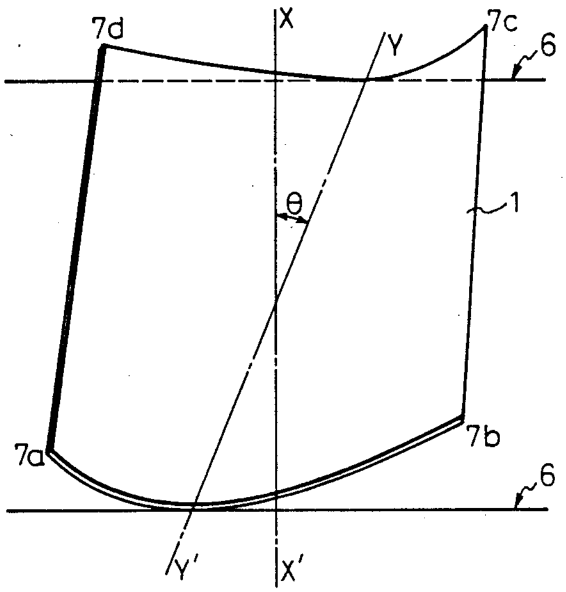

In FIGS. 2 and 3, where a curled photographic paper sheet 1 is placed on a horizontal plane 6, the corner points **7*a*, 7*b*, 7*c* and 7*d* of the sheet 1 are raised respectively by the height $h^1$, $h^2$, $h^3$ and $h^4$ in mm from the horizontal plane 6**. The average height h in mm is $(h^1+h^2+h^3=h^4)/4$.

The intensity of curling of the sheet 1 is represented by $h/W_p$, in which $W_p$ represents a width in mm of the sheet 1.

The axis of the curl of the sheet 1 is represented by a center line Y-Y' of a portion of the sheet 1, which portion of the sheet 1 comes into contact with the horizontal plane 6. The curling axis Y-Y' of the sheet 1 is in parallel to a longitudinal axis X-X' of the sheet 1 along which the sheet 1 is forwarded in a developing machine or intersects the axis X-X' at a right angle or another angle.

Referring to FIGS. 2 and 3, the longitudinal axis X-X' intersects the curling axis Y-Y' at a twisting angle $\theta$.

Generally, where a photographic paper sheet is supplied from a paper roll and continuously processed by an automatic developing machine, the direction along which the sheet is forwarded is in parallel to the longitudinal direction of the sheet. Therefore, the curling axis of the sheet is in parallel to or intersects the forwarding direction of the sheet at a right angle or another angle. When the curling axis of the sheet is not parallel to the forwarding direction of the sheet, and thus intersects the forwarding direction of the sheet at an angle, this curling axis is referred to as "a twisted curling axis" and the intersecting angle is referred to as "a twisting angle $\theta$".

The inventors of the present invention found that a most important factor for regulating the direction of the axis of the curl created in a photographic paper sheet is the resiliency of the substrate paper sheet in the support sheet.

It was found that the cause of the formation of a curl in a waterproof photographic paper sheet, immediately after the sheet is developed and dried or placed in a low humidity atmosphere, is different from the cause of the forming of a curl in a waterproof photographic paper sheet after the sheet is completely moisture-conditioned in an ambient atmosphere and is different from the cause of curling in a conventional baryta type photographic paper sheet.

In the completely moisture-conditioned photographic paper sheet and the baryta type photographic paper sheet, the formation of a curl is derived mainly from the elongation or shrinkage of the substrate paper sheet as well as the photographic emulsion layer containing gelatine, due to the absorption or desorption of moisture.

In the waterproof photographic paper sheet in which the substrate paper sheet is covered by two waterproof polyolefin resin coating layers, when the sheet is developed and dried or placed in a low humidity condition for a short time, the amount of moisture desorbed from the substrate paper sheet is small in comparison with the amount of moisture desorbed from the conventional baryta type photographic paper sheet or a completely moisture-conditioned photographic paper sheet. Further, the modulus of elasticity and shrinkage of the gelatine-containing photographic emulsion layer increases with a decrease in its moisture content by drying. For example, the modulus of elasticity of the gelatine-containing photographic emulsion layer is about 0.3 GPa when equilibrated at 50% RH and is increased to about 2 GPa when equilibrated at 30% RH.

The shrinkage of the gelatine-containing photographic emulsion layer causes the adjacent polyolefin coating layer and the substrate paper sheet layer to be compressed. The intensity of curling depends on the degree of compression of the coating layer of the substrate paper sheet and the direction of the axis of the curl depends on the direction along which these layers are more easily compressed than in the other directions.

The twisted curl-forming mechanism in the substrate paper sheet will be explained below. Generally, in a paper sheet produced by a Fourdrinier type paper machine, the degree of orientation of pulp fibers in the longitudinal direction of the sheet is higher than that in the transversal direction of the sheet. The twisted curl of the paper sheet is created due to an uneven distribution of the degree of orientation of the pulp fibers in the paper sheet. For example, depending on the paper-making conditions, sometimes the degree of orientation of the pulp fibers is irregularly varied along the width direction of the paper sheet, or the degree of orientation of the pulp fibers in the felt side half stratum portion of the paper sheet is different from that in the wire side half stratum portion of the paper sheet. To prevent the creation of the twisted curl, preferably the paper sheet is formed evenly in the distribution of the degree of orientation of the pulp fibers in the paper sheet. But, the production of a paper sheet having a completely even distribution of the degree of orientation of the pulp fibers is very difficult. For example, in the paper-making process by a Fourdrinier type paper machine, usually the paper-forming wire is oscillated at a right angle to the forwarding direction of the paper sheet, to improve the quality of the resultant paper sheet. This oscillation causes the direction of orientation of the pulp fibers dispersed in a pulp slurry to be slightly inclined alternately to the right and left sides from the longitudinal axis of the paper sheet. Usually, it is very difficult to avoid the slight inclination of the orientation direction of the pulp fibers.

The inventors of the present invention found, as a result of intensive investigation, that even where the distribution of direction of orientation of the pulp fibers is slightly uneven, the creation of a twisted curl in the paper sheet can be decreased or prevented by regulating the moduli of elasticity of the face side half stratum portion and the back side half stratum portion of the paper sheet so that they satisfy certain relationships.

When a photographic paper sheet having a five layer structure (including two half stratum portions (*2a*) and (*2b*) of the substrate paper sheet 1 as shown in FIG. 1 is exposed to a low humidity condition, the emulsion layer 4 is rapidly dried, and isotropically shrunk, so that the modulus of elasticity of the emulsion layer 4 is increased. The polyolefin resin coating layer 3a located immediately under the emulsion layer 4 usually has a relatively low modulus of elasticity of 0.2 to 0.3 GPa, and thus is easily compressed due to the isotropic shrinkage of the emulsion layer 4. Then, the substrate paper sheet 2 is also compressed by the shrinkage of the polyolefin resin coating layer 3a. In this process, the shrinkage of the substrate paper sheet 2 due to the decrease in the moisture content is substantially negligible.

The shrinkage of the substrate paper sheet 2 due to the shrinkage of the emulsion layer 4 will be further explained below, with reference to FIG. 1.

When a substrate paper sheet 2 composed of a face side half stratum portion 2a and the remaining back side half stratum portion 2b is compressed due to the shrinkage of the emulsion layer 4, if the modulus of elasticity $E_{fl}$ of the face side half stratum portion 2a in the longitudinal direction of the paper sheet is made higher than the modulus of elasticity $E_{bl}$ of the back side half stratum portion 2b in the longitudinal direction of the paper sheet, the resistance of the face side half stratum portion 2a, which becomes the inside of a curl formed due to the shrinkage of the emulsion layer 4, to compression applied thereto due to the shrinkage of the emulsion layer 4 is increased, so that the creation of a curl is prevented or restricted. This results in a restriction of the formation of a twisted curl in the photographic paper sheet or the creation of a curl in the transverse direction of the photographic paper sheet.

When the modulus of elasticity $E_{bt}$ of the back side half stratum portion 2b in the transverses direction of the paper sheet is made lower than the modulus of elasticity $E_{ft}$ of the face side half stratum portion 2a in the transverse direction of the paper sheet, the face side half stratum portion 2a becomes easily compressible. This property promotes the formation of a curl having a curling axis parallel to the longitudinal axis of the paper sheet. The formation of the curl in the longitudinal axis direction of the paper sheet effectively prevents the creation of a twist in the curl.

To prevent the formation of a twisted curl in the photographic paper sheet, the substrate paper sheet is preferably composed of a back side half stratum portion and a face side half stratum portion satisfying the relationships (III) and (IV):

$$E_{fl} > E_{bl}, \text{ that is } E_{fl}/E_{bl} > 1 \quad \text{(III)}$$

and $$E_{ft} < E_{bt}, \text{ that is } E_{ft}/E_{bt} < 1 \quad \text{(IV).}$$

When the relationship (III) is satisfied, the resultant substrate paper sheet is effective for preventing the formation of a curl having a curling axis intersecting the longitudinal axis of the substrate paper sheet. Also, when the relationship (IV) is satisfied, the resultant substrate paper sheet makes it easy to form a curl having a curling axis in parallel to the longitudinal axis of the substrate paper sheet, and thus the undesirable formation of a twisted curl is restricted.

The above-mentioned relationships (III) and (IV) lead to the following relationship:

$$\frac{E_{fl}}{E_{bl}} / \frac{E_{ft}}{E_{bt}} > 1$$

As a result of a detailed investigation of this relationship in consideration of the shrinking force of the emulsion layer containing gelatine, it was found that the formation of a twisted curl is prevented or restricted when the following relationship is satisfied.

$$\frac{E_{fl}}{E_{bl}} / \frac{E_{ft}}{E_{bt}} = \frac{E_{fl} \cdot E_{bt}}{E_{ft} \cdot E_{bl}} \geqq 0.93 \quad \text{(II)}$$

Also, the contribution of the weight of the substrate paper sheet and the thickness of the polyolefin resin coating layers to the prevention of the twisted curl was investigated in detail.

As a result, it was found that the modulus of elasticity $E_{fl}$ of the face side half stratum portion in the longitudinal direction of the paper sheet is preferably in the range (V):

$$6.6\text{GPa} \leqq E_{fl} \leqq 8.4\text{GPa} \quad \text{(V),}$$

and the modulus of elasticity $E_{bt}$ of the back side half stratum portion in the transverse direction of the paper sheet is preferably in the range (VI):

$$3.7\text{GPa} \leqq E_{bt} \leqq 4.4\text{GPa} \quad \text{(VI)}$$

Furthermore, it was found that when the ratio of the $E_{fl}$ to the $E_{bt}$ satisfies the relationship (I):

$$1.5 \leqq E_{fl}/E_{bt} \leqq 2.25 \quad \text{(I)}$$

the resultant support sheet can provide a photographic paper sheet having a high resistance to undesirable curl-formation.

The modulus of elasticity of each half stratum portion of the substrate paper sheet in each of the longitudinal and transverse directions is determined in the following manner.

For example, the modulus of elasticity of the face side half stratum portion of the substrate paper sheet in each direction is determined by the following method.

(A) A substrate paper sheet to be tested is fixed on a precision grinder in such a manner that the face side surface of the paper sheet comes into contact with the base of the grinder, the upper portion of the paper sheet (i.e., the back side half stratum portion) is gradually ground and removed so that the thickness of the paper sheet is decreased to about ½ of the original thickness.

(B) The remaining half portion, i.e., the face side half stratum portion (F) of the paper sheet, is subjected to the measurement of modulus of elasticity in the longitudinal or transverse direction of the paper sheet by using a tensilometer.

(C) The ground paper sheet (the face side half stratum portion) is formed into specimens having a width of 15 mm and a measuring length (a length of a portion of the specimen to be stretched) of 150 mm. The specimen is stretched by the tensilometer at a low stretching rate of 10 mm/min and a stress-strain curve from the start of the stretching to the break of the specimen is prepared. In this stress-strain curve, an inclination angle of the portion of the curve which is in the form of a substantially straight, line, i.e., ratio ($\Delta T/\Delta l$) of the increase of $\Delta T$ under stress to the elongation $\Delta l$, is measured.

(D) The modulus of elasticity (E) of the face side half stratum portion is calculated in accordance with the equation:

$$E = \left( \frac{\Delta T}{W/h} \quad \frac{\Delta l}{L} \right) \times G$$

wherein $\Delta T$ represents an increase in the stress (kg) in the above-mentioned straight line portion, W represents the width (m) of the specimen, h represents the thickness (m) of the specimen, $\Delta l$ represents the elongation (mm) of the specimen corresponding to $\Delta T$, L represents the measuring length (mm) of the specimen, G represents the acceleration of gravity (9.8 N/kg)

The above-mentioned method for determining the modulus of elasticity takes a long time, and therefore, this method can be replaced by a method in which an apparatus for measuring the transmission speed of ultrasonic waves is used, for the purpose of process control. This measurement can be completed in a short time and can obtain a result similar to that obtained from the method using the tensilometer.

The specimen is fixed to an ultrasonic apparatus in such a manner that four side portions of the specimen are adhered by an adhesive tape to a measuring stand and an ultrasonic wave transmission speed measurement is applied to a center portion of the fixed specimen. The modulus of elasticity (E) of the specimen can be calculated in accordance with the following equation:

$$E=dS^2$$

wherein d represents the apparent density (kg/m$^3$) of the specimen and S represents the transmission speed (m/sec) of an ultrasonic wave.

The modulus of elasticity can be determined by any of the above-mentioned two methods, but in view of a reproducibility of the measuring results, the ultrasonic measuring method is preferable.

In the support sheet for photographic paper, when the substrate paper sheet satisfies the relationships (I) and (II), a curl formed in a photographic paper sheet containing the support sheet is at least in parallel to the longitudinal axis of the paper sheet, and if twisted, the twisting angle from the longitudinal axis of the paper sheet is very small, and thus a highly twisted curl, which results in the deterioration in quality of the resultant photographic paper sheet, cannot be formed.

But, if the relationships (I) and (II) are not satisfied, the resultant photographic paper sheet creates a curl having a curling axis inclined from the longitudinal axis of the paper sheet. The inclination angle of the curling axis is changed and sometimes becomes very large, so that the curl becomes a twisted curl and the movement of the photographic paper sheet in an automatic developing machine becomes difficult.

The substrate paper sheet having a resilience satisfying the relationships (I) and (II) can be produced by controlling a jet/wire speed ratio, which refers to the ratio of the jet flow speed of the pulp slurry supplied through a slit of the flow box to the rotating speed of the paper-forming wire to a predetermined level, and by regulating the draw, which is referred to the difference between the rotating speed of the forming-wire and the running speed of the dryer, to a predetermined level.

In the following description, the face side of the substrate paper on which a photographic emulsion layer is to be formed is provided by the felt-side of the substrate sheet and the back side of the substrate paper is provided by the wire side thereof.

When, in the control of the jet/wire speed ratio, the flow speed of the slurry jet is excessively large in comparison with the running speed of the forming wire, the resultant face side half stratum portion of the paper sheet has a compressed structure, the degree of orientation of the pulp fibers in the face side half stratum portion in the transverse direction becomes excessively larger than that in the back side half stratum portion in the transverse direction, and thus the modulus of elasticity $E_{ft}$ of the felt side half stratum portion in the transverse direction becomes excessively higher than the modulus of elasticity $E_{bt}$ of the back side half stratum portion in the transverse direction of the paper sheet. Accordingly, the resultant substrate paper sheet does not satisfy the relationships (I) and (II), and therefore, the resultant photographic paper sheet often creates a twist curl and the twisting angle of the curl becomes excessively large.

When deckels for regulating a transversal flow of a pulp slurry on a wire net sheet are used, or jet nozzles are used in place of the deckels, if the speed of the pulp slurry jet supplied from a headbox to the pulp-making zone is extremely high, both side portions of the pulp slurry jet flow tend to overflow from the side edges of the forming wire, and thus the degree of orientation of pulp fibers in the both edge portions of the resultant face side half stratum portion in the transverse direction becomes excessively high, and both side edge portions of the resultant photographic paper sheet are easily twist-curled.

Also, when the draw in the press zone in the paper-making process is made excessively small, the degree of tension between the pulp fibers combined with each other in the resultant paper sheet becomes excessively low, the modulus of elasticity of the resultant paper sheet becomes very low, and thus the resultant paper sheet does not satisfy the relationship (I). When this substrate paper sheet is used, in the resultant photographic paper sheet, the support sheet cannot overcome the shrinking force of the gelatine-containing photographic emulsion layer, and thus the photographic paper sheet is twist-curled with a curling axis which intersects the longitudinal axis of the photographic paper sheet and the moving direction thereof in the automatic developing machine.

Further, when two side edge plates (cheek pieces) of a slice lip of a headbox through which a pulp slurry jet is ejected to a paper-forming zone, have the same depth as that of the slice lip, both side edge portions of the pulp slurry jet tend to flow to the outside over the both side edges of the slice lip. When the amount of the overflowing pulp slurry becomes excessively large, in the resultant paper sheet, the face side half stratum portion exhibits a lower degree of orientation of the pulp fibers in the longitudinal direction than that of the back side half stratum portion, and thus the modulus of elasticity of the face side half stratum portion in the longitudinal direction becomes lower than that of the back side half stratum portion. Therefore, a substrate paper sheet produced under the above-mentioned conditions does not satisfy the relationship (II) and the resultant photographic paper sheet formed from the support sheet easily forms a twisted curl.

Furthermore, the substrate paper sheet satisfying the relationships (I) and (II) can be produced by adequately selecting the type of forming wire for the paper-making process, by adequately designing the initial dewatering zone and deckels for regulating transversal flows of a pulp slurry on a forming wire, and by setting an adequate degree of beating operation for the pulp. The above-mentioned conditions and designs should be preliminarily decided by provisional tests by taking into consideration the type of the paper-making machine and the paper-making process conditions.

Before the present invention, it was unknown to prevent or restrict the twisted curl formed in the photographic paper sheet by controlling the physical property (the resiliency), especially a modulus of elasticity of the substrate paper sheet to be contained therein. Particularly, it was found for the first time by the present inventors that the undesirable formation of a twisted curl in a photographic paper sheet can be prevented or restricted by controlling the moduluses of elasticity, $E_{fl}$, $E_{bl}$, $E_{ft}$ and $E_{bt}$, of the face side and back side half stratum portions, in longitudinal and transversal directions of the substrate paper sheet so that they satisfy the relationships (I) and (II).

The support sheet of the present invention for photographic paper is produced by forming two coating layers comprising a polyolefin resin on two surfaces of a substrate paper sheet satisfying the above-mentioned specific relationships (I) and (II).

A substrate paper sheet usable for the present invention can be made from the usual paper-forming fibrous material used for the conventional substrate paper sheet for photographic paper.

The paper-forming material is selected from, for example, natural pulps and synthetic pulps, mixtures of at least one type of natural pulp with at least one type of synthetic pulp and various paper-forming fibrous material mixtures. Usually, the natural pulps, including hard wood pulp, soft wood pulp and mixtures of hard and soft wood pulps, are widely used.

The paper-forming material for the substrate paper sheet of the present invention may contain, as an additive, at least one member selected from conventional sizing agents, fixing agents, paper strengthen-promoting agents, fillers, pH-controlling agents, antistatics and dyes. Also, a surface sizing agent, surface strengthen-promoting agent, antistatic and/or dye may be coated on the surface of the substrate paper sheet.

The substrate paper sheet usable for the present invention preferably has a weight of 50 to 300 $g/m^2$, more preferably 140 to 200 $g/m^2$, and is preferably provided with smooth surfaces.

The waterproof thermoplastic resin for coating the two surfaces of the substrate paper sheet is selected from polyolefin resins. The polyolefin resin can be selected from homopolymers of ethylene, $\alpha$-olefins, for example, propylene, copolymers of at least two of the above-mentioned monomers, and mixtures of two or more of the above-mentioned polymers. Preferably, the polyolefin resin is selected from low density polyethylene resins, high density polyethylene resins and a mixture of two or more of the above-mentioned resins. The polyolefin resin is not restricted to those having a specific molecular weight, but preferably has a molecular weight of from 20,000 to 200,000.

The coating layers formed on the substrate paper sheet preferably have a weight of 10 to 50 g/m2, more preferably 20 to 40 g/m2.

The polyolefin resin usable for forming the back side coating layer which is opposite to the face side coating layer on which a photographic emulsion layer is formed, usually comprises a low density polyethylene resin, a high density polyethylene resin, or a mixture thereof, and is melt-coated on the lower surface of a substrate paper sheet by a melt-coating method. The back side coating layer surface is usually matted.

The polyolefin resin to be used for forming the face side coating layer on which the photographic emulsion layer is formed, comprises a white pigment, for example, titanium dioxide particles dispersed in a resin matrix, and may further contain an additive, for example, coloring pigment, fluorescent brightening agent, antioxidant or dispersing agent.

As stated above, one side of the substrate paper sheet, on which the polyolefin coating layer containing a pigment and then the photographic emulsion layer are to be formed, is referred to as a "face side" and the opposite side of the substrate paper sheet, on which the polyolefin coating layer free from the pigment is formed, is referred to as a "back side" of the substrate paper sheet.

The elastic moduli of the face side and back side half stratum portions of the substrate paper sheet should be controlled in accordance with the present invention so that they satisfy the relationships (I) and (II).

To enhance the flatness of the developed print sheet under the usual circumstances in which the print is used, in the formation of the face side and back side coating layers on the substrate paper sheet, preferably the face side coating layer is formed from a polyolefin, resin having a slightly smaller density than that used for the back side coating layer or the amount of the back side coating layer per unit area is made larger than that of the face side coating layer.

Usually, the face side and back side coating layers are formed from polyolefin resin compositions on two surfaces of the substrate paper sheet by a melt-extrusion-coating method.

When the melt-extrusion-coating method is carried out, the substrate paper sheet is continuously forwarded at a constant speed, a melt of the polyolefin resin composition is extruded through the slit of an extrusion die in the form of a thin film, and the extruded filmy stream of the melt is laminated on a surface of the substrate paper sheet.

Usually, the polyolefin resin composition is preferably melted and extruded at a temperature of 200° C. to 350° C. Optionally, before the melt-extrusion-coating procedure, the surfaces of the substrate paper sheet are preferably activated for adhesion by a corona discharge treatment or a flame treatment.

The surface of the support sheet of the present invention may be activated for adhesion by a corona discharge treatment or a flame treatment. If necessary, a subcoat layer is formed on the face side coating layer of the support sheet to enhance the adhesive property of the face side coating layer to the photographic emulsion layer, or a backcoat layer is formed on the back side coating layer of the support sheet to enhance the type writing property and/or antistatic property of the lower surface of the support sheet.

In the preparation of a photographic paper sheet, the surface of a face side coating layer of a substrate paper sheet is coated with a photographic emulsion. The photographic emulsion may be a black and white photosensitive emulsion or a color photosensitive emulsion.

Generally, the photographic emulsion contains a silver salt in an amount of several tens mg per 100 g of the emulsion and gelatine in an amount of 4% to 8% by weight.

The photographic emulsion layer on the support sheet is usually in an amount of 10 $g/m^2$ by dry weight.

EXAMPLES

The present invention will be further illustrated by way of the following examples.

EXAMPLES 1 AND 2 AND COMPARATIVE EXAMPLES 1 TO 3

(A) Preparation of substrate paper sheet

In each of Examples 1 and 2 and Comparative Examples 1 to 3, a mixed pulp was prepared from 20% by weight of a bleached soft wood sulfite pulp having a Canadian Standard freeness of 250 ml determined in accordance with JIS P 8121-1976 and 80% by weight of bleached hard wood sulfate pulp having a Canadian Standard freeness of 280 ml and fed to a Fourdrinier type paper machine to provide a paper sheet having a weight of 170 $g/m^2$, a density of 1.05 $g/cm^3$, and a moisture content of 8% by weight. The mixed pulp used in the above-mentioned process contained an additive having the following composition:

| Component | Amount based on the total dry weight of the mixed pulp (%) |
|---|---|
| Cationized starch | 2.0 |

-continued

| Component | Amount based on the total dry weight of the mixed pulp (%) |
|---|---|
| Alkylketene dimer resin | 0.4 |
| Anionic polyacrylamide resin | 0.1 |
| Polyamidepolyamine epichlorohydrin resin | 0.7 |

The pH of the mixed pulp slurry was adjusted to 7.5 by adding an aqueous sodium hydroxide solution.

A carboxy-modified polyvinyl alcohol was mixed with sodium chloride in a mixing weight ratio of 2:1, and the resultant mixture was dissolved in water to provide a 5% aqueous solution of a press sizing agent.

The press-sizing agent solution was applied in an amount of 25 $g/m^2$ to the two surfaces of the paper sheet.

Also, in the paper-making process, the depth of the cheek pieces attached to the two side edge portions of the slice portion of the headbox was 100 mm longer than that of the slice lip, to prevent an overflow of the pulp slurry from the two side edges of the forming wire. Further, the jet stream of the pulp slurry was regulated by deckels arranged on the forming wire. Furthermore, the ratio ($J/W_i$) of the jet speed (J) of the pulp slurry to the running speed of ($W_i$) of the forming wire was adjusted as shown in Table 1.

TABLE 1

| Example No. | Item: Ratio J/Wi of jet speed (J) of pulp slurry to running speed (Wi) of forming wire | Draw |
|---|---|---|
| Comparative Example | | |
| 1 | J was much larger than Wi | Small |
| 2 | J was much larger than Wi | Large |
| 3 | J was slightly larger than Wi | Small |
| Example 1 | J was slightly larger than Wi | Large |

The moduli of elasticity of a face side half stratum portion and a back side half stratum portion of the resultant paper sheet were determined by the ultrasonic wave transmission speed-measuring method. In each of the resultant paper sheets of Example 1 and Comparative Examples 1 to 3, the face side thereof was provided by the felt side thereof and the back side thereof was provided by the wire side thereof. In the resultant paper sheet of Example 2, the face side thereof was provided by the felt side thereof and the back side thereof was provided by the wire side thereof. The results are shown in Table 2.

In the measurement, the paper sheet was cut to provide specimens having a width of 18 cm and a length of 18 cm, and each specimen was adhered to a measuring stand by an adhesive tape. The specimens were subjected to measurements by an ultrasonic wave transmission speed-measuring machine (available under a trademark of Sonic Tester SST-200 Type, made by Nomura Shoji Co.).

As shown in Table 2, the paper sheets of Examples 1 and 2 satisfied the relationships (I) and (II), but the paper sheets of Comparative Examples 1 to 3 did not satisfy at least one of the relationships (I) and (II).

TABLE 2

| Example No. | Ultrasonic wave transmission speed (km/sec): Face side half stratum portion, Longitudinal direction | Face side half stratum portion, Transversal direction | Back side half stratum portion, Longitudinal direction | Back side half stratum portion, Transversal direction | Modulus of elasticity (GPa) $E_{fl}$ | $E_{ft}$ | $E_{bl}$ | $E_{bt}$ | $E_{fl}/E_{bt}$ | $E_{fl}\cdot E_{bt}/E_{ft}\cdot E_{bl}$ |
|---|---|---|---|---|---|---|---|---|---|---|
| Comparative Example | | | | | | | | | | |
| 1 | 2.324 | 1.781 | 2.534 | 1.810 | 5.67 | 3.33 | 6.74 | 3.44 | 1.65 | 0.87 |
| 2 | 2.591 | 1.799 | 2.690 | 1.765 | 7.05 | 3.40 | 7.60 | 3.27 | 2.16 | 0.90 |
| 3 | 2.272 | 1.934 | 2.372 | 2.019 | 5.42 | 3.93 | 5.91 | 4.28 | 1.27 | 1.0 |
| Example 1 | 2.660 | 1.846 | 2.674 | 1.922 | 7.43 | 3.58 | 7.51 | 3.88 | 1.91 | 1.07 |
| Example 2 | 2.534 | 1.810 | 2.324 | 1.781 | 6.74 | 3.44 | 5.67 | 3.33 | 2.02 | 1.15 |

(B) Production of support sheet for photographic paper

In each of Example 1 and Comparatives 1 to 3, the face side surface of the substrate paper sheet was activated by a corona discharge treatment and coated with a mixture of one part by weight of a high density polyethylene resin having a density of 0.94 $g/cm^3$ and a melt index (MI) of 8.0 g/10 min and one part by weight of a low density polyethylene resin having a density of 0.92 $g/cm^3$ and a MI of 4.6 g/10 min by a melt-extrusion-coating method at a resin temperature of 330° C, and the coating layer was solidified by cooling while applying a matting operation to the coating layer surface by a cooling roll to provide a back side waterproof coating layer having a thickness of 26 μm.

Then, the face side surface of the substrate paper sheet was activated by a corona discharge treatment and coated with a resin composition consisting of 90% by weight of a mixture of 8 parts by weight of the same high density polyethylene resin as mentioned above and 2 parts by weight of the same low density polyethylene resin as mentioned above, and 10% by weight of a titanium dioxide powder, by a melt-extrusion-coating method at a resin temperature of 320° C., to provide a waterproof face side coating layer having a thickness of 28 μm and provided with a glossy surface.

In Example 2, the same procedures as those described in Comparative Example 1 were carried out except that the face side of the substrate paper sheet was provided by the wire side thereof and the back side was provided by the felt side thereof.

(C) Preparation of photographic paper (Coating of photographic emulsion)

The face side coating layer of the support sheet was activated by a corona discharge treatment.

A photographic emulsion was prepared by mixing a silver salt emulsion (available under the trademark of Liquid Light, made by Rockland Colloide Co.) with $2\times10^{-4}$ moles/g of a gelatine-hardner available under the trademark of Gelatin-Hardner HDU, made by Sogo Yakuko Co. and comprising N,N'-hexamethylene-1,6-bis(1-aziridine carboxyamide).

The activated face side coating layer surface was coated with the photographic emulsion in a coating amount of 10 g/m$^2$ by dry weight, the coating layer of the photographic emulsion was dried and solidified by blowing cold air, heated at a temperature of 40° C for 90 minutes, cured at 40° C at 50% RH for 60 hours, and then moisture-conditioned at 20° C at 65% RH for 2 hours.

(D) Developing test

The resultant photographic paper sheet was cut into a specimen sheet having a length (in the longitudinal direction of the photographic paper sheet) of 114 mm and a width of 82 mm. The specimen sheet was supplied to a developing machine in such a manner that the longitudinal axis of the specimen sheet was parallel to the axis along which the sheet was forwarded, and developed in a developing liquid (available under a trademark of Sakura Color PC Paper Developing Kit) at a temperature of 40° C for 3 minutes, bleach-fixed in a fixing liquid (available under a trademark of Fixing liquid for Sakura Color PC Paper Developing Liquid) at 40° C for 3 minutes, washed with water at 30° C. for 5 minutes, and then dried in a room conditioned at a temperature of 30° C. at 30% RH by using an air dryer (available under a trademark of Dryer JRC-33 type, made by F. C. Manufacturing Co., Ltd.) at a temperature of 80° C. for 2 minutes. After the drying procedure was completed, the dried specimen sheet was conditioned at 30° C. at 30% RH for 2 hours. Thereafter, the twisting angle of the conditioned photographic paper sheet specimen, defined as hereinbefore, was measured. The results are shown in Table 3.

When the twisting angle was 8° degrees or less, the photographic paper sheet was evaluated as having a practically satisfactory resistance to curl formation.

TABLE 3

| Example No. | Item — Twisting angle: Twist immediately after developing and drying, observed by naked eye | Twisting angle after conditioning at 30° C. at 30% RH for 2 hours (degree) |
|---|---|---|
| Comparative Example | | |
| 1 | Large | 30 |
| 2 | Slightly large | 15 |
| 3 | Slightly large | 10 |

TABLE 3-continued

| Example No. | Item — Twisting angle: Twist immediately after developing and drying, observed by naked eye | Twisting angle after conditioning at 30° C. at 30% RH for 2 hours (degree) |
|---|---|---|
| Example | | |
| 1 | Small | 1 |
| 2 | Small | 1 |

Table 3 clearly shows that the photographic paper sheets of Examples 1 and 2 had a satisfactory resistance to twisted curl formation.

EXAMPLES 3 AND 4 AND COMPARATIVE EXAMPLES 4 TO 6

In each of Examples 3 and 4 and Comparative Examples 4 to 6, the same procedures as those described respectively in Examples 1 and 2 and Comparative Examples 1 to 3 were carried out except that, in the preparation of substrate paper sheet, the length of the cheek pieces arranged on the two side edge portions of the slice head was made equal to the depth of the slice lip.

The ultrasonic wave transmission speeds and the moduli of elasticity of the half stratum portions of the resultant substrate sheets were as shown in Table 4.

In Example 4, the same procedures as those mentioned in Comparative Example 3 were carried out except that, in the resultant substrate paper sheet of Example 4, the face side of the sheet was provided by the wire side thereof and the back side was provided by the felt side thereof.

TABLE 2

| Example No. | Ultrasonic wave transmission speed (km/sec) — Felt-contacted half stratum portion (F): Longitudinal direction | (F): Transversal direction | Wire-side half stratum portion (W): Longitudinal direction | (W): Transversal direction | Modulus of elasticity (GPa): $E_{fl}$ | $E_{ft}$ | $E_{bl}$ | $E_{bt}$ | $E_{fl}/E_{bt}$ | $E_{fl}\cdot E_{bt}/E_{ft}\cdot E_{bl}$ |
|---|---|---|---|---|---|---|---|---|---|---|
| Comparative Example | | | | | | | | | | |
| 4 | 2.158 | 1.952 | 2.382 | 1.964 | 4.89 | 4.00 | 5.96 | 4.05 | 1.21 | 0.83 |
| 5 | 2.348 | 1.957 | 2.507 | 1.947 | 5.79 | 4.02 | 6.60 | 3.98 | 1.46 | 0.87 |
| 6 | 2.418 | 1.859 | 2.602 | 1.882 | 6.14 | 3.63 | 7.11 | 3.72 | 1.65 | 0.88 |
| Example 3 | 2.539 | 1.823 | 2.643 | 1.887 | 6.77 | 3.49 | 7.35 | 3.74 | 1.81 | 0.99 |
| Example 4 | 2.507 | 1.947 | 2.348 | 1.957 | 6.60 | 3.98 | 5.79 | 4.02 | 1.64 | 1.15 |

Table 4 clearly illustrates that only the substrate paper sheets of Examples 3 and 4 satisfied both the relationships (I) and (II).

The twisting angles of the resultant photographic paper sheets are shown in Table 5.

TABLE 5

| Example No. | Item — Twisting angle: Twist immediately after developing and drying, observed by the naked eye | Twisting angle after conditioning at 30° C. at 30% RH for one hour (degree) |
|---|---|---|
| Comparative Example | | |
| 4 | Large | 80 |
| 5 | Large | 25 |
| 6 | Slightly large | 10 |
| Example | | |
| 3 | Small | 3 |

TABLE 5-continued

| | Item | |
|---|---|---|
| | Twisting angle | |
| Example No. | Twist immediately after developing and drying, observed by the naked eye | Twisting angle after conditioning at 30° C. at 30% RH for one hour (degree) |
| 4 | Small | 2 |

Table 5 shows that the twisting angles in Examples 3 and 4 were slightly larger than that in Example 1, but were satisfactorily small enough for practical use. The photographic paper sheets of Comparative Examples 4 to 6 had unsatisfactory large twisting angles.

As described hereinbefore, the specific support sheets of the present invention in which a substrate paper sheet satisfies the specific relationships (I) and (II) are useful for a photographic paper sheet which (II),exhibits a twisting angle of 8 degrees or less, and thus has a high resistance to twisted curl formation. Therefore the support sheet of the present invention is useful for providing a photographic paper sheet having an enhanced ease of handling in the developing procedure and an improved commercial quality.

We claim:

1. A support sheet for photographic paper, comprising:

a substrate paper sheet comprising a face side and a back side opposite thereto;

two coating layers formed on said two sides of the substrate paper sheet which comprise polyolefin resin, and a photographic emulsion layer on one of said coating layers, wherein said substrate paper has a resilient properly satisfying the relationships (I) and (II):

$$1.5 \leqq E_{fl}/E_{bt} \leqq 2.25 \quad \text{(I)}$$

and $$\frac{E_{fl} \cdot E_{bt}}{E_{ft} \cdot E_{bl}} \geqq 0.93 \quad \text{(II)}$$

wherein $E_{fl}$ represents the modulus of elasticity of the face side half stratum portion in the longitudinal direction of said substrate paper sheet, $E_{bt}$ represents the modulus of elasticity of the back side half stratum portion in the transverse direction of said substrate paper sheet, $E_{ft}$ represents the modulus of elasticity of the face side half stratum portion in the transverse direction of said substrate paper sheet, and $E_{bl}$ represents the modulus of elasticity of the back side half stratum portion in the longitudinal direction of said substrate paper sheet.

2. The support sheet as claimed in claim 1, wherein the substrate paper sheet has a weight of 140 to 200 $g/m^2$.

3. The support sheet as claimed in claim 1, wherein the polyolefin resin in the coating layers comprises a polyethylene resin.

4. The support sheet as claimed in claim 1, wherein each of the coating layers has a thickness of 10 to 50 μm.

5. The support sheet as claimed in claim 1, wherein the $E_{fm}$ and $E_{wc}$ in the relationships (I) and (II) are in the following ranges:

$$6.6\text{GPa} \leqq E_{fl} \leqq 8.4\text{GPa}$$

and $$3.7\text{GPa} \leqq E_{bt} \leqq 4.4\text{GPa}$$

* * * * *